United States Patent
Sugano et al.

(10) Patent No.: US 10,666,630 B2
(45) Date of Patent: May 26, 2020

(54) COMMUNICATION APPARATUS, COMMUNICATION METHOD, AND COMMUNICATION PROGRAM PRODUCT THAT AUTHENTICATE COMMUNICATION DATA

(71) Applicant: DENSO CORPORATION, Kariya, Aichi-pref. (JP)

(72) Inventors: Yasuharu Sugano, Kariya (JP); Takeshi Sugashima, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/747,833

(22) PCT Filed: Aug. 4, 2016

(86) PCT No.: PCT/JP2016/072875
§ 371 (c)(1),
(2) Date: Jan. 26, 2018

(87) PCT Pub. No.: WO2017/026359
PCT Pub. Date: Feb. 16, 2017

(65) Prior Publication Data
US 2018/0227284 A1 Aug. 9, 2018

(30) Foreign Application Priority Data

Aug. 7, 2015 (JP) .................................. 2015-157232

(51) Int. Cl.
*H04L 9/08* (2006.01)
*H04L 9/32* (2006.01)
(Continued)

(52) U.S. Cl.
CPC ................ *H04L 63/08* (2013.01); *H04L 9/08* (2013.01); *H04L 9/32* (2013.01); *H04L 12/40006* (2013.01); *H04L 67/12* (2013.01)

(58) Field of Classification Search
CPC ... H04L 63/08; H04L 9/08; H04L 9/32; H04L 12/40006; H04L 67/12
See application file for complete search history.

(56) References Cited

U.S. PATENT DOCUMENTS

2005/0243204 A1* 11/2005 Zhu .................. H04N 7/012
348/448
2014/0223557 A1* 8/2014 Card ...................... G06F 21/44
726/22

(Continued)

*Primary Examiner* — Alexander Lagor
*Assistant Examiner* — Rodman Alexander Mahmoudi
(74) *Attorney, Agent, or Firm* — Posz Law Group, PLC

(57) ABSTRACT

A communication apparatus includes a counter, a reception portion, an update portion, a code generation portion, a determination portion, and a transmission portion. The reception portion receives a communication data from a different one of the communication apparatus. The update portion updates a value of the counter. The code generation portion generates a message authentication code based on the communication data received by the reception portion, the value of the counter, and a common key. The determination portion determines whether the message authentication code generated by the code generation portion matches a message authentication code set in the communication data. The transmission portion transmits a synchronization request when a number of times that the determination portion determines a mismatch between the message authentication codes becomes equal to or more than a predetermined number of mismatches.

15 Claims, 3 Drawing Sheets

(51) Int. Cl.
    *H04L 29/06*     (2006.01)
    *H04L 12/40*     (2006.01)
    *H04L 29/08*     (2006.01)

(56) References Cited

U.S. PATENT DOCUMENTS

2014/0310530 A1   10/2014   Oguma et al.
2016/0255065 A1*   9/2016   Oshida ................ H04L 61/6022
                                                  726/3
2016/0297401 A1*   10/2016   Haga ..................... B60R 25/307

* cited by examiner

COMMUNICATION APPARATUS, COMMUNICATION METHOD, AND COMMUNICATION PROGRAM PRODUCT THAT AUTHENTICATE COMMUNICATION DATA

CROSS REFERENCE TO RELATED APPLICATIONS

This application is a U.S. national stage application of International Application No. PCT/JP2016/072875 filed on Aug. 4, 2016 and is based on Japanese Patent Application No. 2015-157232 filed on Aug. 7, 2015, the disclosures of which are incorporated herein by reference.

TECHNICAL FIELD

The present disclosure relates to a communication apparatus, communication method, and communication program product each of which authenticates communication data communicated on a network by a message authentication code.

BACKGROUND

A technique that authenticates communication data communicated on a network by a message authentication code (Message Authentication Code: MAC) is known (see, e.g., Patent Literature 1). In a technique disclosed in Patent Literature 1, each of communication apparatuses connected to the network increments a value which is stored in a corresponding counter, each time another communication apparatus transmits a main message.

A transmission communication apparatus transmits the main message and a MAC message that includes a MAC generated based on the main message and a value counted by the counter.

A reception communication apparatus determines whether the MAC, which is generated based on a received main message and the value of the counter stored in the reception communication apparatus, matches a MAC included in the received MAC message. With this configuration, the reception communication apparatus determines validity of the received main message.

PATENT LITERATURE

Patent Literature 1: JP 2013-98719 A

SUMMARY

In a technique disclosed in Patent Literature 1, validity of a main message is capable of being determined based on a MAC. In the technique disclosed in Patent Literature 1, when the main message is determined to be invalid, cause of invalidity is incapable of being estimated. Suppose that the cause of the invalidity of the main message cannot be estimated. In this case, an appropriate procedure for resolving the cause is incapable of being implemented.

In view of the foregoing difficulties, it is an object of the present disclosure to provide a communication apparatus, communication method, and communication program product each of which technique implements appropriate procedure by estimating the cause of the invalidity when communication data communicated on a network is determined to be invalid.

According to an aspect of the present disclosure, a communication apparatus is provided. The communication apparatus is connected to a network and authenticates communication data communicated on the network based on a message authentication code. The communication apparatus includes a counter, a reception portion, an update portion, a code generation portion, a determination portion, and a transmission portion.

The reception portion receives the communication data from a different one of the communication apparatus. The update portion updates a value of the counter in order to match a value of a counter of the different communication apparatus when the reception portion receives the communication data from the different communication apparatus.

The code generation portion generates the message authentication code based on the communication data received by the reception portion, the value of the counter, and a common key. The determination portion determines whether the message authentication code generated by the code generation portion matches a message authentication code set in the communication data.

The transmission portion transmits a synchronization request. The transmission portion matches the value of the counter with the value of the counter of the different communication apparatus when a number of times that the determination portion determines a mismatch between the message authentication code generated by the code generation portion and the message authentication code set in the communication data received by the reception portion becomes equal to or more than a predetermined number of mismatches.

In the above-described configuration, when the mismatch of the message authentication codes occurs, the cause is estimated as deviation of the value of the counter between a transmission communication apparatus and a reception communication apparatus, and the transmission communication apparatus transmits the synchronization request for synchronizing the counters. Thus, when the cause of the mismatch between the message authentication codes is the deviation of the values of the counters between the transmission communication apparatus and the reception communication apparatus, the cause of the mismatch between the message authentication codes can be specified by requesting the synchronization of the counters as an appropriate procedure.

BRIEF DESCRIPTION OF DRAWINGS

The above and other objects, features and advantages of the present invention will become more apparent from the following detailed description made with reference to the accompanying drawings. In the drawings.

DETAILED DESCRIPTION

Hereinafter, embodiments of the present disclosure will be described with reference to the drawings.

1. Configuration

Figure 1:
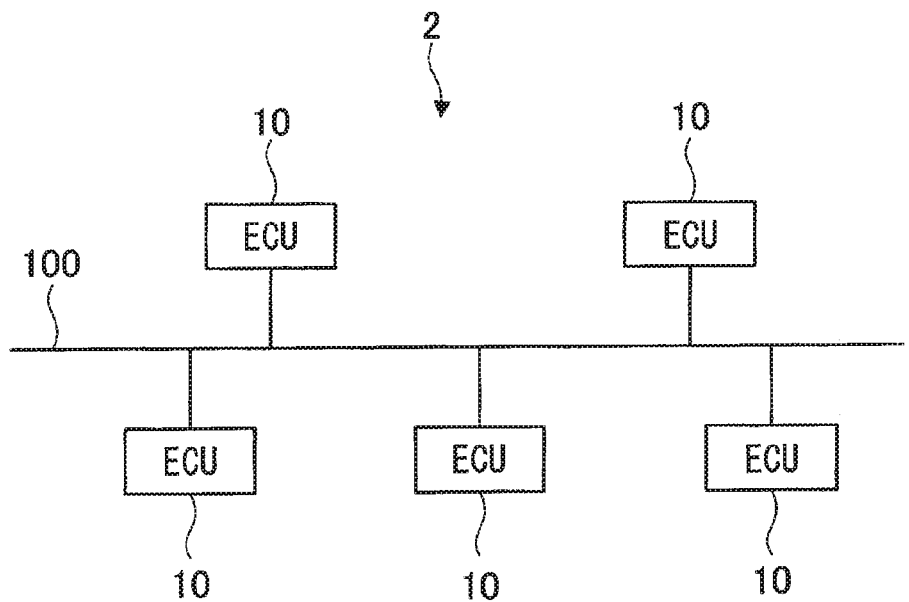
FIG. 1 is a block diagram showing a communication system according to an embodiment.

As shown in FIG. 1, a communication system 2 includes a CAN (Controller Area Network) bus 100 and multiple communication apparatuses 10. Each of the multiple communication apparatuses 10 has a same configuration.

The network connecting each of the communication apparatus 10 is not limited to CAN, and may be provided by any network under a condition that each of the communication apparatuses 10 is capable of communicating with one another through the network. The communication apparatus 10 may be applied to any purpose of use. For example, the communication apparatus 10 may be provided by ECU (Electronic Control Unit) connected to an in-vehicle network.

Figure 2:
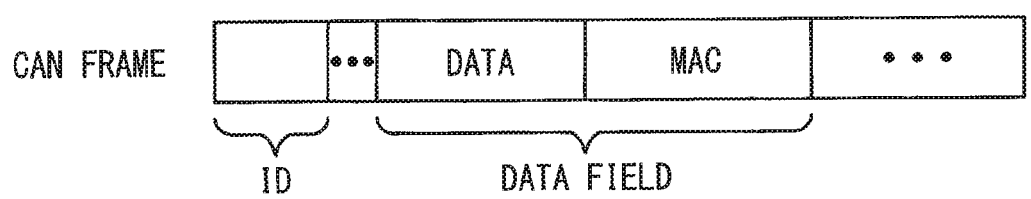
FIG. 2 is a diagram showing a configuration of a CAN frame.

The communication apparatus 10 determines validity of communication data based on a message authentication code (MAC). In the CAN bus 100, a CAN frame is used as a communication frame, and the communication data is communicated by the CAN frame. The MAC is generated by a publicly known MAC generation method, such as HMCA or CMAC. As shown in FIG. 2, The MAC is set in a data field of the CAN frame together with data.

Figure 3:
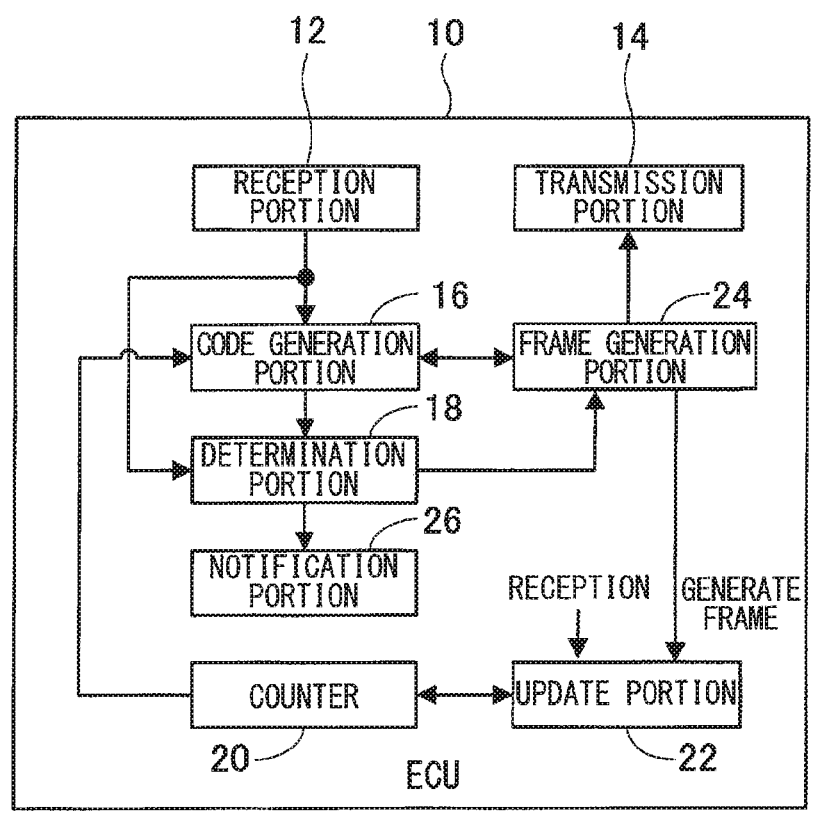
FIG. 3 is a block diagram showing a communication apparatus according to an embodiment.

The communication apparatus 10 has a microcomputer including CPU, RAM, ROM, a flash memory, an input/output interface, or the like. As shown in FIG. 3, the communication apparatus 10 includes a reception portion 12, a transmission portion 14, a code generation portion 16, a determination portion 18, a counter 20, an update portion 22, a frame generation portion 24, and a notification portion 26 as functional blocks.

The reception portion 12 receives the CAN frame from the CAN bus 100. The transmission portion 14 transmits the CAN frame to the CAN bus 100.

Suppose that the code generation portion 16 determines that the communication data received by the reception portion 12 is a processing object and an authentication object that is required to be authenticated by the MAC. The determination is made based on the ID of the CAN frame received by the reception portion 12. In this case, the code generation portion 16 selects a bit sequence, which has a same bit length as the MAC set in the data field of the received CAN frame, from a bit sequence generated by the ID of the received CAN frame, the data set in the data field of the received CAN frame, a value of the counter 20, and a common key. Then, the code generation portion 16 generates the MAC based on the selected bit sequence. The common key is stored in a rewritable nonvolatile memory, such as a flash memory.

More than one communication apparatus 10 may determine that the received communication data is the processing object and the authentication object by the MAC based on the ID of the CAN frame received by the corresponding reception portion 12.

Suppose that the frame generation portion 24 generates the CAN frame including the MAC, and the transmission portion 14 transmits the generated CAN frame. In this case, the code generation portion 16 selects a bit sequence, which has the same bit length as the MAC set in the data field, from the bit sequence generated by the ID of the CAN frame, data set in the data field, the value of the counter 20, and the common key. Then, the code generation portion 16 generates the MAC based on the selected bit sequence.

Suppose that the communication data received by the reception portion 12 is the processing object and the authentication object based on the MAC. In this case, the determination portion 18 determines whether the MAC generated by the code generation portion 16 from the ID of the received CAN frame, the data set in the data field of the received CAN frame, the value of the counter 20, and the common key matches the MAC set in the data field of the received CAN frame. Hereinafter, the matching of the MACs represents equality between MACs.

When the determination portion 18 determines that the MAC generated by the code generation portion 16 matches the received MAC, the communication data of the CAN frame is determined to be valid. When the determination portion 18 determines that the MAC generated by the code generation portion 16 does not match the received MAC, the communication data of the CAN frame is determined to be invalid.

The value of the counter 20 is stored in a nonvolatile memory apparatus, such as the flash memory. The value of the counter 20 is stored for each ID of the CAN frame. Each of the communication apparatuses 10 only stores the value of the counter 20 corresponding to the ID to be processed by the own apparatus.

Suppose that the communication data received by the reception portion 12 is the processing object and the authentication object based on the MAC. In this case, the update portion 22 adds one to a value counted by the corresponding counter 20. The update portion 22 adds one to the value counted by the counter 20 before the code generation portion 16 generates the MAC to be set in the data field of the CAN frame. Then, the CAN frame is generated by the frame generation portion 24 and transmitted from the transmission portion 14.

When the transmission portion 14 transmits the CAN frame, the frame generation portion 24 sets a value in each field of each CAN frame. When the transmission portion 14 transmits the communication data that is the authentication object based on the MAC, the frame generation portion 24 sets the MAC, which is generated by the code generation portion 16, in the data field.

Suppose that the MAC generated by the code generation portion 16 does not match the received MAC and the cause of mismatch of the MACs is incapable of being identified. In this case, the notification portion 26 generates a diagnosis code, which indicates the mismatch of the MACs and failure in identifying the cause of mismatch as an abnormality, and stores the diagnosis code in the rewritable nonvolatile memory apparatus, such as the flash memory. Alternatively, the notification portion 26 may send notification of the abnormality from the transmission portion 14 to a notification communication apparatus 10.

2. Process

Figure 4:
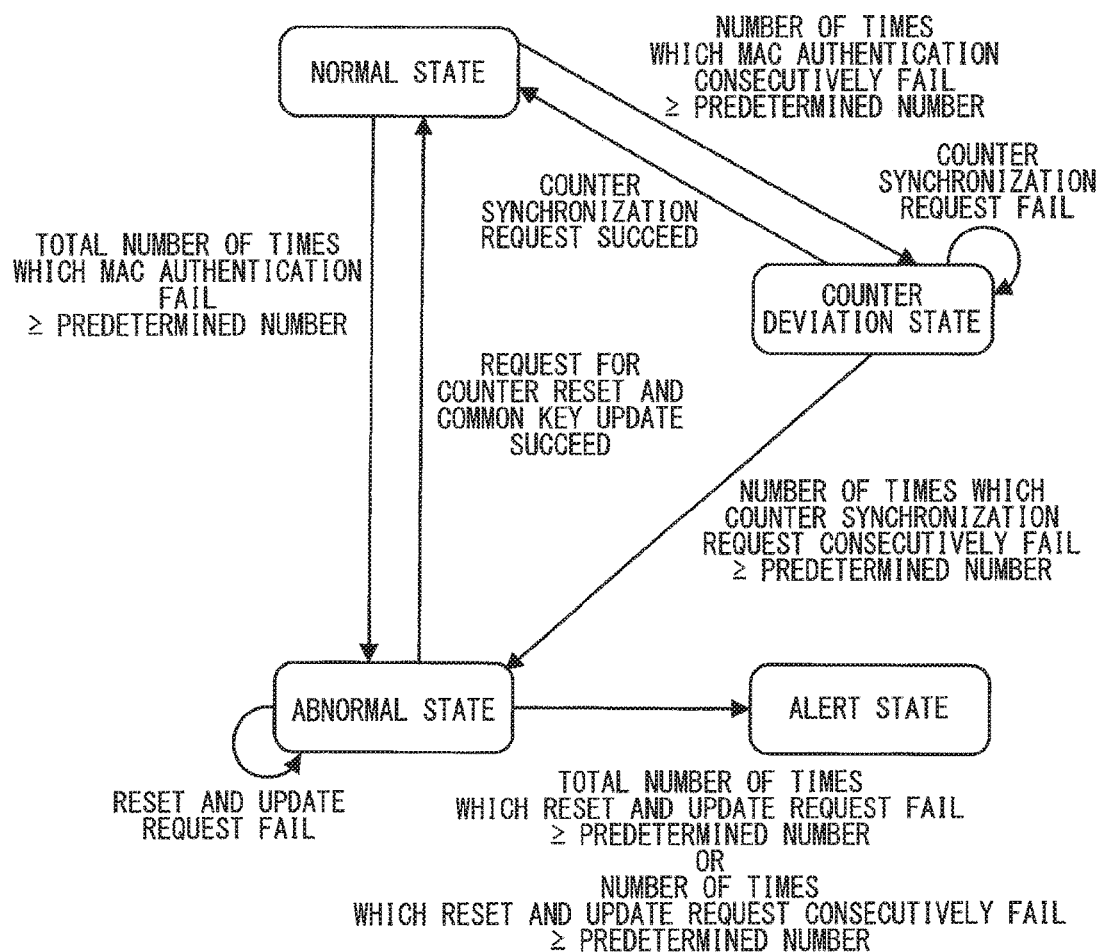
FIG. 4 is a state transition diagram showing a communication process.

Communication process executed by the communication apparatus 10 will be described with reference to a state transition diagram of FIG. 4.

During a normal state, the MAC generated by the code generation portion 16 is equal to the MAC set in the data field of the received CAN frame. The code generation portion 16 generates the MAC from the ID, the data set in the data field each of which is included in the CAN frame received by the reception portion 12, the value of counter 20 which is incremented by one by the update portion 22, and the common key.

During the normal state, in the CAN frame received by the reception portion 12, suppose that a number of times that the determination portion 18 consecutively determines a mismatch between the MACs becomes equal to or more than a predetermined number of consecutive mismatches. In this case, the reception communication apparatus 10 estimates that a value of the counter 20 of the reception communication apparatus 10 deviates from the value of the counter 20 of the transmission communication apparatus 10, and shifts from the normal state to a counter deviation state.

The predetermined number of consecutive mismatches is set, with consideration of erroneous determination at the determination portion 18 caused by noise, to an appropriate value that is capable of estimating that the cause of mismatches between the MACs is the deviation between the values of the counters 20 on transmission end and the reception end.

After the reception communication apparatus 10 shifts from the normal state to the counter deviation state, in the reception communication apparatus 10, the transmission portion 14 transmits a synchronization request in the CAN frame to the transmission communication apparatus 10. Herein, the synchronization request is transmitted to match the value of the counter 20 of the transmission communication apparatus 10 with the value of the counter 20 of the reception communication apparatus 10. In the reception communication apparatus 10, the frame generation portion 24 generates the synchronization request to be transmitted by the transmission portion 14 using the CAN frame. The frame generation portion 24 does not set the MAC in the data field of the synchronization request to be transmitted by the transmission portion 14.

With the above-described configuration, the transmission communication apparatus 10 that receives the synchronization request does not need to authenticate the MAC. Thus, even though a count value of the counter of the reception communication apparatus 10 deviates from a count value of the counter of the transmission communication apparatus 10, the CAN frame that requests the synchronization of the counters is normally processed in the transmission communication apparatus 10.

The transmission communication apparatus 10, which receives the synchronization request for the counter 20, transmits the value of the counter 20 to the reception communication apparatus 10 that has transmitted the synchronization request. The transmission communication apparatus 10 does not set the MAC in the data field of the CAN frame which includes the value of the counter.

Suppose that the reception portion 12 of the reception communication apparatus 10 receives the value of the counter 20 transmitted from the transmission communication apparatus 10 in response to the synchronization request for the counter 20. In this case, the update portion 22 of the reception communication apparatus 10 synchronizes the own counter 20 with the counter 20 of the transmission communication apparatus 10 by rewriting the value of the own counter 20 to the received counter value of the transmission communication apparatus 10.

Alternatively, a value of a counter 20 of another communication apparatus 10 may be received by the reception communication apparatus 10 and the transmission communication apparatus 10 in response to the synchronization request transmitted from the reception communication apparatus 10 for synchronizing the counters 20. Herein, another communication apparatus 10 is other than the reception communication apparatus 10 and transmission communication apparatus 10. In this case, in each of the reception communication apparatus 10 and transmission communication apparatus 10, the update portion 22 synchronizes the counter 20 with the counter 20 of another communication apparatus 10 by rewriting the value of the counter 20 to the value of the counter of another communication apparatus 10.

After the counter 20 is synchronized, when the reception portion 12 of the reception communication apparatus 10 receives the CAN frame, which is transmitted from the transmission communication apparatus 10, the determination portion 18 of the reception communication apparatus 10 determines whether the generated MAC matches the received MAC. When determining that the generated MAC matches the received MAC, the reception communication apparatus 10 shifts from the counter deviation state to the normal state.

During the counter deviation state, suppose that a number of times that the determination portion 18 consecutively determines a mismatch between the MACs becomes equal to or more than a predetermined number of synchronizations even though the transmission portion 14 transmits the synchronization request for the counter 20. In this case, the reception communication apparatus 10 estimates that at least one of the common key or the values of the counters 20 between the reception communication apparatus 10 and the transmission communication apparatus 10 deviates, and then shifts from the counter deviation state to an abnormal state.

The predetermined number of synchronizations is set to an appropriate value with consideration of erroneous determination at the determination portion 18 caused by noise. Specifically, the predetermined number of synchronizations is set such that the cause of mismatches between the MACs is estimated that at least one of the common key or the values of the counters 20 deviates between the reception communication apparatus 10 and the transmission communication apparatus 10.

During the normal state, in the CAN frame received by the reception portion 12 of the reception communication apparatus 10, suppose that a total number of times that the determination portion 18 determines a mismatch between the MACs becomes equal to or more than a predetermined number of total mismatches. In this case, the reception communication apparatus 10 shifts from the normal state to the abnormal state. The predetermined number of total mismatches is set to be greater than the predetermined number of consecutive mismatches.

During the abnormal state, the reception communication apparatus 10 transmits a reset and update request, which requests the transmission communication apparatus 10 to reset the value of the counter 20 and to update the common key, from the transmission portion 14 of the reception communication apparatus 10.

Suppose that the reception communication apparatus 10 transmits the reset and update request, which requests the reset of the value of the counter 20 and the update of the common key. In this case, the values of counters 20 of the reception communication apparatus 10, the transmission communication apparatus 10, and another communication apparatus 10 are reset and initialized by the update portion 22 of own communication apparatus 10, and the common key shared by the communication apparatuses 10 is updated and regenerated by the code generation portion 16 of own communication apparatus 10.

During the abnormal state, after the value of each counter 20 is reset and the common key is updated, in the CAN frame, which is transmitted from the transmission communication apparatus 10 and received by the reception portion 12 of the reception communication apparatus 10, the determination portion 18 of the reception communication apparatus 10 determines whether the generated MAC matches received MAC. When determining that the generated MAC matches the received MAC, the reception communication apparatus 10 shifts from the abnormal state to the normal state.

During the abnormal state, in the reception communication apparatus 10, suppose that a number of times that the determination portion 18 consecutively determines a mismatch between the MACs becomes equal to or more than a predetermined number of consecutive resets and updates even though the transmission portion 14 transmits the reset and update request. Herein, the reset and update request requests the reset of the value of the counter 20 and the update of the common key. In this case, the reception communication apparatus 10 estimates that the abnormality is caused by the failure of specifying the cause of mismatches between the MACs, and then shifts from the abnormal state to an alert state.

The predetermined number of consecutive resets and updates is set to an appropriate value with consideration of erroneous determination at the determination portion 18 caused by noise. Specifically, the predetermined number of consecutive resets and updates is set such that the cause of mismatches between the MACs is estimated that the abnormality is caused by the failure of specifying the cause of mismatches between the MACs. A predetermined number of total resets and updates described below is set to an appropriate value for the same reason.

During the abnormal state, in the reception communication apparatus 10, suppose that a total number of times that the determination portion 18 determines a mismatch between the MACs becomes equal to or more than a predetermined number of total resets and updates even though the transmission portion 14 transmits the reset and update request. Herein, the reset and update request requests the reset of the value of the counter 20 and the update of the common key. In this case, the reception communication apparatus 10 shifts from the abnormal state to the alert state. The predetermined number of total reset and update is set to be greater than the predetermined number of consecutive resets and updates.

When shifting to the alert state, the notification portion 26 of the reception communication apparatus 10 stores the diagnosis code in the flash memory. Herein, the diagnosis code indicates the abnormality that the cause of the mismatch between the MACs is incapable of being specified. The diagnosis code that indicates the abnormality may be read out by another communication apparatus 10 in response to a diagnosis request transmitted from another communication apparatus 10. The abnormality may be notified by a display device, a lighting device, an audio device, or the like.

When shifting to the alert state, the notification portion 26 may send the notification of the abnormality from the transmission portion 14 to the notification communication apparatus 10.

3. Advantages

The above-described embodiment can provide the following advantages.

(1) Suppose that the number of times that the determination portion 18 consecutively determines the mismatch between the MACs becomes equal to or more than the predetermined number of consecutive mismatches. In this case, the reception communication apparatus 10 estimates that the mismatch is caused by the deviation of the value of the counters 20 between the transmission communication apparatus 10 and the reception communication apparatus 10, and the transmission portion 14 transmits the synchronization request for synchronizing the counter 20. With this configuration, when the mismatch between the MACs is caused by the deviation of the values of the counters 20 between the transmission communication apparatus 10 and the reception communication apparatus 10, the cause of the mismatch between the MACs can be correctly specified and solved by requesting the synchronization of each counter 20 on transmission end and reception end as an appropriate procedure.

(2) When the number of times that the determination portion 18 consecutively determines the mismatch between the MACs becomes equal to or more than the predetermined number of consecutive mismatches, the reception communication apparatus 10 requests the synchronization of each counter 20 before requesting the update of the common key. With this configuration, execution of the update of the common key, which takes longer processing time than execution of the synchronization of each counter 20, can be avoided to the utmost extent. With this configuration, the communication system that has low processing capacity can preferably avoid the update of the common key. The communication system that has low processing capacity may include the communication system in which the communication apparatus 10 is connected to an in-vehicle network.

(3) Suppose, as a first case, that the number of times that the determination portion 18 consecutively determines the mismatch between the MACs becomes equal to or more than the predetermined number of synchronizations even though the transmission portion 14 has transmitted the synchronization request for synchronizing the counter 20. Suppose, as a second case, that the total number of times that the determination portion 18 determines the mismatch between the MACs becomes equal to or more than the predetermined number of total mismatches even though the transmission portion 14 has transmitted the synchronization request for synchronizing the counter 20. In the first case or the second case, the reception communication apparatus 10 estimates that the cause of mismatch between the MACs is caused by the deviation of at least one of the common key or the values of the counters 20, and transmits the reset and update request. Herein, the reset and update request requests the reset of the value of each counter 20 and the update of the common key.

With the above-described configuration, when the mismatch between the MACs is caused by the deviation of at least one of the common key or the values of the counter 20, the cause of the mismatch between the MACs can be solved by requesting the reset of the value of each counter 20 and the update of the common key as an appropriate procedure.

(4) During the abnormal state, suppose, as a first case, that the number of times that the determination portion 18 consecutively determines the mismatch between the MACs becomes equal to or more than the predetermined number of consecutive resets and updates even though the transmission portion 14 has transmitted the reset and update request. During the abnormal state, suppose, as a second case, that the total number of times that the determination portion 18 determines the mismatch between the MACs becomes equal to or more than the predetermined number of total resets and updates even though the transmission portion 14 has transmitted the reset and update request. Herein, the reset and update request requests the reset of the value of each counter 20 and the update of the common key. In the first or the second case, the reception communication apparatus 10 sets the diagnosis code, which indicates the abnormality, or transmits a signal indicating the abnormality to the notification communication apparatus 10. With this configuration, the abnormality can be notified.

4. Other Embodiments (1) In the above-described embodiment, corresponding to different conditions indicating the mismatch of the MACs, either the synchronization request for the counter 20 or the reset and update request is executed. Herein, the reset and the update request requests the reset of the value of the counter 20 and the update of the common key. Alternatively, only the synchronization request for the counter 20 may be executed corresponding to the different conditions indicating the mismatch of the MACs.

(2) In the above-described embodiment, the data and the MAC are set in the same data field of the CAN frame. Alternatively, the data and the MAC may be set in different CAN frames.

The transmission communication apparatus 10 may set the data, the MAC, and a value of at least low bits of the own counter 20 in the data field of the CAN frame that is transmitted to the reception communication apparatus 10. In this configuration, the reception communication apparatus 10 may rewrite low bits of the value of the own counter 20 to the low bits of the value of the counter 20 of the transmission communication apparatus 10 included in the received CAN frame.

(3) In each embodiment, a function which one item has may be divided to multiple items, and a function which multiple items have may be integrated to one item. In each embodiment, a part of a configuration may be omitted. At least a part of a configuration described above in one embodiment may be added to another embodiment or may replace the corresponding configuration in another embodiment.

(4) Various kinds of other embodiments may be implemented except for the above-described communication apparatus 10. For example, a communication system 2 including the communication apparatus 10, a communication program to be executed by a computer to function as the communication apparatus 10, a storage medium storing the communication program, or a communication method may be provided as the various embodiments.

The invention claimed is:

1. A communication apparatus which is connected to a network and authenticates communication data communicated on the network based on a message authentication code, the communication apparatus comprising:
   a counter;
   a reception portion that receives the communication data from a different one of the communication apparatus;
   an update portion that updates a value of the counter in order to match a value of a counter of the different communication apparatus when the reception portion receives the communication data from the different communication apparatus;
   a code generation portion that generates the message authentication code based on the communication data received by the reception portion, the value of the counter, and a common key;
   a determination portion that determines whether the message authentication code generated by the code generation portion matches a message authentication code set in the communication data; and
   a transmission portion that
   (i) transmits a synchronization request and matches the value of the counter with the value of the counter of the different communication apparatus when a mismatch-number of times that the determination portion determines a mismatch between the message authentication code generated by the code generation portion and the message authentication code set in the communication data received by the reception portion becomes equal to or more than a predetermined mismatch-number of mismatches, and
   (ii) transmits a reset and update request, which requests a reset of the counter and an update of the common key, when a total-mismatch-number of times that the determination portion determines the mismatch between the message authentication code generated by the code generation portion and the message authentication code set in the communication data received by the reception portion becomes equal to or more than a predetermined total-number of total mismatches, wherein the predetermined total-number of total mismatches is set to be greater than the predetermined mismatch-number of mismatches,
   wherein the transmission portion transmits the synchronization request and matches the value of the counter with the value of the counter of the different communication apparatus when a consecutive-number of times that the determination portion consecutively determines the mismatch between the message authentication code generated by the code generation portion and the message authentication code set in the communication data becomes equal to or more than a predetermined synchronization-number of consecutive mismatches.

2. The communication apparatus according to claim 1, wherein
   the transmission portion further transmits the reset and update request, when the mismatch-number of times that the determination portion determines the mismatch between the message authentication code generated by the code generation portion and the message authentication code set in the communication data received by the reception portion becomes equal to or more than a predetermined synchronization-number of synchronizations after the transmission portion has transmitted the synchronization request.

3. The communication apparatus according to claim 2, wherein
   the transmission portion further transmits the reset and update request, when a consecutive-number of times that the determination portion consecutively determines the mismatch between the message authentication code generated by the code generation portion and the message authentication code set in the communication data received by the reception portion becomes equal to or more than the predetermined synchronization-number of synchronizations after the transmission portion has transmitted the synchronization request.

4. The communication apparatus according to claim 1, further comprising
   a notification portion that notifies an occurrence of abnormality when a consecutive-number of times that the determination portion consecutively determines the mismatch between the message authentication code generated by the code generation portion and the message authentication code set in the communication data received by the reception portion becomes equal to or more than a predetermined reset-number of consecutive resets and updates after the transmission portion has transmitted the synchronization request.

5. The communication apparatus according to claim 1, further comprising
   a notification portion that notifies an occurrence of abnormality when the total-mismatch-number of times that the determination portion determines the mismatch between the message authentication code generated by the code generation portion and the message authentication code set in the communication data received by the reception portion becomes equal to or more than a predetermined total-reset-number of total reset and update requests after the transmission portion has transmitted the synchronization request.

6. The communication apparatus according to claim 1, wherein
the communication data and the message authentication code that is used in authentication of the communication data are set together in a same communication frame.

7. The communication apparatus according to claim 1, wherein
the communication apparatus is connected to an in-vehicle network.

8. A communication method, wherein a communication apparatus that is connected to a network authenticates communication data communicated on the network based on a message authentication code,
the communication method comprising:
matching a value of a counter of the communication apparatus with a value of a counter of a different one of the communication apparatus by updating the value of the counter of the communication apparatus when the communication data is received from the different communication apparatus;
generating the message authentication code based on the communication data that is received, the value of the counter of the communication apparatus, and a common key;
determining whether the message authentication code that is generated matches a message authentication code set in the communication data that is received;
transmitting (i) a synchronization request and matching the value of the counter of the communication apparatus with the value of the counter of the different communication apparatus when a mismatch-number of times of determining a mismatch between the message authentication code that is generated and the message authentication code set in the communication data that is received becomes equal to or more than a predetermined mismatch-number of mismatches; and
transmitting (ii) a reset and update request, which requests a reset of the counter and an update of the common key, when a total-mismatch-number of times of determining a mismatch between the message authentication code which is generated and the message authentication code set in the communication data which is received becomes equal to or more than a predetermined total-number of total mismatches, wherein the predetermined total-number of total mismatches is set to be greater than the predetermined mismatch-number of mismatches,
wherein the transmitting transmits the synchronization request and matches the value of the counter with the value of the counter of the different communication apparatus when a consecutive-number of times of determining the mismatch between the message authentication code which is generated and the message authentication code set in the communication data becomes equal to or more than a predetermined synchronization-number of consecutive mismatches.

9. A non-transitory tangible computer readable storage medium, comprising a communication program product, the communication program product comprising instructions to be executed by a computer, the computer is included in a communication apparatus that is connected to a network and authenticates communication data communicated on the network based on a message authentication code, the instructions for implementing:
matching a value of a counter of the communication apparatus with a value of a counter of a different one of the communication apparatus by updating the value of the counter of the communication apparatus when the communication data is received from the different communication apparatus;
generating the message authentication code based on the communication data that is received, the value of the counter of the communication apparatus, and a common key;
determining whether the message authentication code that is generated matches a message authentication code set in the communication data that is received;
transmitting (i) a synchronization request and matching the value of the counter of the communication apparatus with the value of the counter of the different communication apparatus when a mismatch-number of times of determining a mismatch between the message authentication code that is generated and the message authentication code set in the communication data that is received becomes equal to or more than a predetermined mismatch-number of mismatches; and
transmitting (ii) a reset and update request, which requests a reset of the counter and an update of the common key, when a total-mismatch-number of times of determining a mismatch between the message authentication code which is generated and the message authentication code set in the communication data which is received becomes equal to or more than a predetermined total-number of total mismatches, wherein the predetermined total-number of total mismatches is set to be greater than the predetermined mismatch-number of mismatches,
wherein the transmitting transmits the synchronization request and matches the value of the counter with the value of the counter of the different communication apparatus when a consecutive-number of times of determining the mismatch between the message authentication code which is generated and the message authentication code set in the communication data becomes equal to or more than a predetermined synchronization-number of consecutive mismatches.

10. A communication apparatus which is connected to a network and authenticates communication data communicated on the network based on a message authentication code, the communication apparatus comprising:
a counter;
a reception portion that receives the communication data from a different one of the communication apparatus;
an update portion that updates a value of the counter in order to match a value of a counter of the different communication apparatus when the reception portion receives the communication data from the different communication apparatus;
a code generation portion that generates the message authentication code based on the communication data received by the reception portion, the value of the counter, and a common key;
a determination portion that determines whether the message authentication code generated by the code generation portion matches a message authentication code set in the communication data; and a transmission portion that transmits a synchronization request and matches the value of the counter with the value of the counter of the different communication apparatus when a consecutive-mismatch-number of times that the determination portion consecutively determines a mismatch between the message authentication code generated by the code generation portion and the message authentication code set in the communication data received by the reception portion becomes equal to or more than a predetermined consecutive-mismatch-number of consecutive mismatches, wherein:

the different communication apparatus transmits the value of the counter of the different communication apparatus in response to the synchronization request; and the reception portion receives the value of the counter of the different communication apparatus.

11. The communication apparatus according to claim 10, wherein the transmission portion transmits a reset and update request, which requests a reset of the counter and an update of the common key, when a total-mismatch-number of times that the determination portion determines the mismatch between the message authentication code generated by the code generation portion and the message authentication code set in the communication data received by the reception portion becomes equal to or more than a predetermined total-number of total mismatches, and the predetermined total-number of total mismatches is set to be greater than the predetermined consecutive-mismatch-number of consecutive mismatches.

12. A communication method, wherein a communication apparatus that is connected to a network authenticates communication data communicated on the network based on a message authentication code, the communication method comprising:

matching a value of a counter of the communication apparatus with a value of a counter of a different one of the communication apparatus by updating the value of the counter of the communication apparatus when the communication data is received from the different communication apparatus;

generating the message authentication code based on the communication data that is received, the value of the counter of the communication apparatus, and a common key;

determining whether the message authentication code that is generated matches a message authentication code set in the communication data that is received; and transmitting a synchronization request and matching the value of the counter of the communication apparatus with the value of the counter of the different communication apparatus when a mismatch-number of times of consecutively determining a mismatch between the message authentication code that is generated and the message authentication code set in the communication data that is received becomes equal to or more than a predetermined consecutive-mismatch-number of consecutive mismatches, wherein the value of the counter of the different communication apparatus is transmitted from the different communication apparatus in response to the synchronization request.

13. The communication method according to claim 12, further comprising transmitting a reset and update request, which requests a reset of the counter and an update of the common key, when a total-mismatch-number of times of the determining the mismatch between the message authentication code that is generated and the message authentication code set in the communication data that is received becomes equal to or more than a predetermined total-number of total mismatches, which is set to be greater than the predetermined consecutive-mismatch-number of consecutive mismatches.

14. A non-transitory tangible computer readable storage medium, comprising a communication program product, the communication program product comprising instructions to be executed by a computer, the computer is included in a communication apparatus that is connected to a network and authenticates communication data communicated on the network based on a message authentication code, the instructions for implementing:

matching a value of a counter of the communication apparatus with a value of a counter of a different one of the communication apparatus by updating the value of the counter of the communication apparatus when the communication data is received from the different communication apparatus;

generating the message authentication code based on the communication data that is received, the value of the counter of the communication apparatus, and a common key;

determining whether the message authentication code that is generated matches a message authentication code set in the communication data that is received; and transmitting a synchronization request and matching the value of the counter of the communication apparatus with the value of the counter of the different communication apparatus when a consecutive-number of times of consecutively determining a mismatch between the message authentication code that is generated and the message authentication code set in the communication data that is received becomes equal to or more than a predetermined mismatch-number of consecutive mismatches, wherein the value of the counter of the different communication apparatus is transmitted from the different communication apparatus in response to the synchronization request.

15. The non-transitory tangible computer readable storage medium according to claim 14, wherein the instructions further implementing transmitting a reset and update request, which requests a reset of the counter and an update of the common key, when a total-mismatch-number of times of the determining the mismatch between the message authentication code that is generated and the message authentication code set in the communication data that is received becomes equal to or more than a predetermined total-number of total mismatches, which is set to be greater than the predetermined mismatch-number of consecutive mismatches.

* * * * *